US009986025B2

(12) United States Patent
Jiang et al.

(10) Patent No.: US 9,986,025 B2
(45) Date of Patent: May 29, 2018

(54) LOAD BALANCING FOR A TEAM OF NETWORK INTERFACE CONTROLLERS

(71) Applicant: Nicira, Inc., Palo Alto, CA (US)

(72) Inventors: Jingchun Jiang, Beijing (CN); Donghai Han, Beijing (CN); Wenyu Zhang, Beijing (CN); Jianwei Ma, Beijing (CN)

(73) Assignee: Nicira, Inc., Palo Alto, CA (US)

( * ) Notice: Subject to any disclaimer, the term of this patent is extended or adjusted under 35 U.S.C. 154(b) by 185 days.

(21) Appl. No.: 15/162,628

(22) Filed: May 24, 2016

(65) Prior Publication Data

US 2017/0346885 A1 Nov. 30, 2017

(51) Int. Cl.

| H04L 12/863 | (2013.01) |
| --- | --- |
| H04L 29/08 | (2006.01) |
| H04L 12/743 | (2013.01) |
| H04L 12/803 | (2013.01) |
| H04L 12/801 | (2013.01) |

(52) U.S. Cl.
CPC ...... *H04L 67/1002* (2013.01); *H04L 45/7453* (2013.01); *H04L 47/10* (2013.01); *H04L 47/125* (2013.01); *H04L 47/16* (2013.01); *H04L 47/623* (2013.01)

(58) Field of Classification Search
CPC ............. H04L 67/1002; H04L 67/1029; H04L 67/1008; H04L 45/7453; H04L 45/12; H04L 45/00; H04L 47/10; H04L 47/16; H04L 47/623; H04L 47/125; H04L 43/0817; H04L 41/0896; H04B 7/026
See application file for complete search history.

(56) References Cited

U.S. PATENT DOCUMENTS

| 8,493,839 | B2 | 7/2013 | Cripe et al. | |
| --- | --- | --- | --- | --- |
| 2007/0002738 | A1* | 1/2007 | McGee | H04L 45/12 370/230 |
| 2008/0043617 | A1* | 2/2008 | Schekochikhin | H04L 43/0817 370/229 |
| 2010/0077409 | A1 | 3/2010 | Hernandez et al. | |
| 2010/0131636 | A1* | 5/2010 | Suri | H04L 45/00 709/224 |
| 2011/0090912 | A1* | 4/2011 | Shippy | H04L 67/1002 370/400 |
| 2011/0153840 | A1* | 6/2011 | Narayana | H04L 67/1029 709/227 |
| 2014/0036665 | A1* | 2/2014 | Chowdhury | H04L 41/0896 370/230 |

(Continued)

*Primary Examiner* — Le H Luu
(74) *Attorney, Agent, or Firm* — Su IP Consulting

(57) ABSTRACT

An example method is provided for a host to perform load balancing for multiple network interface controllers (NICs) configured as a team. The method may comprise the host detecting egress packets from a virtualized computing instance supported by the host for transmission to a destination via the team. The method may also comprise the host selecting one of the multiple NICs from the team based on load balancing weights associated with the respective multiple NICs. Each load balancing weight may be assigned based on a network speed supported by the associated NIC, and different load balancing weights are indicative of different network speeds among the multiple NICs in the team. The method may further comprise the host sending, via the selected one of the multiple NICs, the egress packets to the destination.

24 Claims, 7 Drawing Sheets

(56) References Cited

U.S. PATENT DOCUMENTS

| | | | |
|---|---|---|---|
| 2015/0207754 A1* | 7/2015 | Johnson | H04L 47/125 709/226 |
| 2016/0094318 A1* | 3/2016 | Shattil | H04B 7/026 375/267 |
| 2016/0164787 A1* | 6/2016 | Roach | H04L 47/125 370/235 |
| 2016/0164956 A1* | 6/2016 | Hopen | H04L 67/1008 709/208 |
| 2016/0197836 A1* | 7/2016 | Hussain | H04L 45/00 713/160 |
| 2017/0142194 A1* | 5/2017 | Bolshakov | H04L 67/1002 |
| 2017/0317932 A1* | 11/2017 | Paramasivam | H04L 47/125 |

* cited by examiner

LOAD BALANCING FOR A TEAM OF NETWORK INTERFACE CONTROLLERS

BACKGROUND

Unless otherwise indicated herein, the approaches described in this section are not admitted to be prior art by inclusion in this section.

Virtualization allows the abstraction and pooling of hardware resources to support virtual machines in a virtualized computing environment, such as a Software-Defined Datacenter (SDDC). For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. In practice, a host may utilize multiple physical network interface controllers (NICs) to improve network throughput and fault tolerance. However, it can be challenging for the host to perform load balancing for the different NICs such that they are utilized fairly and efficiently.

DETAILED DESCRIPTION

Figure 1:
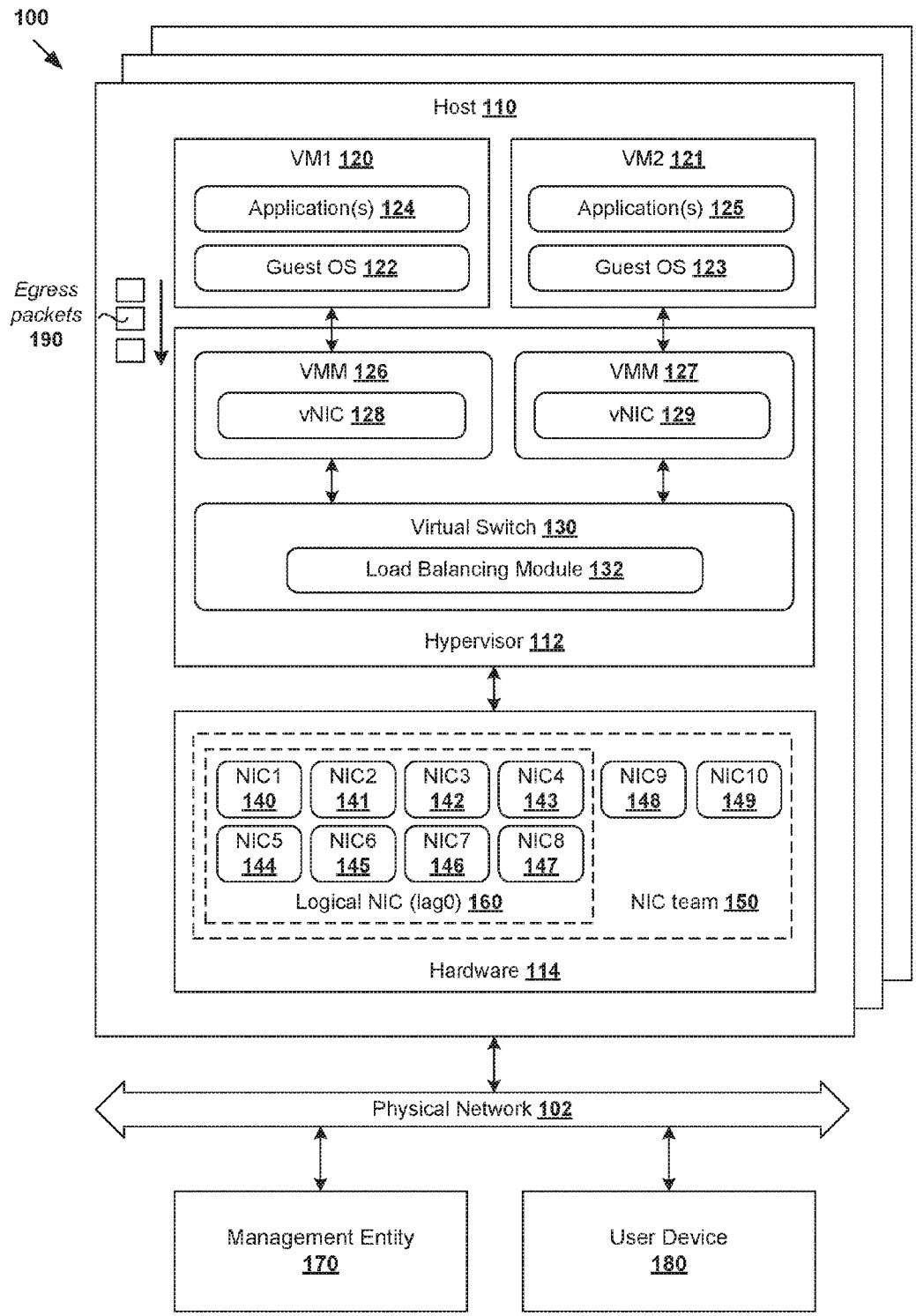
FIG. 1 is a schematic diagram illustrating an example virtualized computing environment in which load balancing is performed for multiple NICs configured as a team.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

The challenges of performing load balancing for multiple physical network interface controllers (NICs) will now be explained in more detail using FIG. 1. In particular, FIG. 1 is a schematic diagram illustrating example virtualized computing environment 100 in which load balancing is performed for multiple NICs configured as a team. It should be understood that, depending on the desired implementation, virtualized computing environment 100 may include additional and/or alternative components than that shown in FIG. 1.

In the example in FIG. 1, virtualized computing environment 100 includes multiple hosts 110 (one shown in detail for simplicity; also known as "computing devices", "host computers", "host devices", "physical servers", "server systems", etc.) that are connected to physical network 102. Each host 110 includes suitable virtualization software (e.g., hypervisor 112) and hardware 114 to support virtual machines, such as "VM1" 120 and "VM2" 121. Although one host 110 and two virtual machines 120, 121 are shown for simplicity, there may be multiple hosts 110, each supporting tens or hundreds of virtual machines in practice.

Each host 110 is connected with management entity 170 via physical network 102. Management entity 170 provides management functionalities to manage various objects, such as hosts 110, virtual machines 120-121, etc. In practice, management entity 170 may be implemented by one or more virtual or physical entities. Users (e.g., network administrators) operating user devices 180 may access the functionalities of management entity 170 via any suitable interface (e.g., graphical user interface, command-line interface, etc.) and/or Application Programming Interface (API) calls via physical network 102. User device 180 may be any suitable computing device, such as user workstation, client device, mobile device, etc.

Virtual machine 120/121 represents a software implementation of a physical machine. Although examples of the present disclosure refer to "virtual machines," it should be understood that virtual machines 120, 121 running within host 110 are merely one example of "virtualized computing instances" or "workloads." In general, a virtualized computing instance may represent an addressable data compute node or isolated user space instance. In practice, any suitable technology may be used to provide isolated user space instances, not just hardware virtualization. For example, other virtualized computing instances may include containers (e.g., running on top of a host operating system without the need for a hypervisor or separate operating system such as Docker; or implemented as an operating system level virtualization), virtual private servers, client computers, etc. The virtual machines may also be complete computation environments, containing virtual equivalents of the hardware and system software components of a physical computing system.

Hypervisor 112 maintains a mapping between underlying hardware 114 of host 110 and virtual resources allocated to virtual machine 120/121. Hardware 114 includes suitable physical components (not all shown for simplicity), such as Central Processing Unit (CPU), memory (e.g., random access memory), storage disk (e.g., solid state drive, hard disk drive), and physical NICs 140-149, etc. Virtual resources are allocated to virtual machine 120/121 to support guest operating system 122/123 and application(s) 124/125, etc. For example, corresponding to hardware 114, the virtual resources may include virtual CPU, virtual memory, virtual disk, virtual network interface controller (vNIC), etc.

Virtual machine monitors (VMMs) 126-127 implemented by hypervisor 112 are to emulate hardware resources. For example, VMM 126 is to emulate vNIC 128 to provide network access for "VM1" 120 and VMM 127 to emulate vNIC 128 for "VM2" 121. In practice, VMM 126/127 may be considered as components that are part of virtual machine 120/121, or alternatively, separated from virtual machine 120/121. In both cases, VMM 126/127 maintains the state of vNIC 128/129. When virtual machine 120/121 is migrated, data relating to the state is also migrated.

Hypervisor 112 further supports virtual switch 130 to handle traffic forwarding to and from "VM1" 120 and "VM2" 121. For example, virtual machine 120/121 may send egress (i.e., outgoing) packets and receive ingress packets (i.e., incoming) via physical network 102 during a communication session with another node (e.g., virtual machine, physical host, etc.). In this case, virtual machine 120/121 may act as an "endpoint" of a bi-directional inter-process communication flow with another endpoint. An endpoint may be capable of creating a socket to facilitate the communication flow, such as Transmission Control Protocol (TCP) sockets, raw Internet Protocol (IP) sockets, etc.

Virtual switch 130 receives egress packets from, and sends ingress packets to, "VM1" 120 via vNIC 128. Similarly, virtual switch 130 receives egress packets from, and sends ingress packets to, "VM2" 121 via vNIC 129. The node with which VM1" 120 or "VM2" 121 communicates may be an external host, virtual machine, etc. As used herein, the term "packets" may refer generally to a group of bits that can be transported together from a source to a destination, such as "segments," "frames," "messages," "datagrams," etc. The egress packets may be sent via one of physical NICs 140-149. Physical network 102 may be any suitable network, such as wide area network, virtual private network (VPN), etc.

In the example in FIG. 1, NIC teaming is used to configure physical NICs 140-149 as a "NIC team" or "team" 150. As used herein, the term "NIC team" or "team" may refer generally the grouping of multiple physical NICs into one logical NIC for fault tolerance and load balancing purposes. Depending on the desired implementation, NIC teaming is sometimes referred to as port trunking, link bundling, NIC bonding, link aggregation, etc. Any suitable technology or protocol may be used for NIC teaming, such as Link Aggregation Control Protocol (LACP), Ethernet Channel (EtherChannel), Port Aggregation Protocol (PAgP), etc. In relation to fault tolerance, each member of team 150 is generally capable of connecting to physical network 102 independently of other members. This way, NIC teaming eliminates a single point of failure for any one physical NIC, thereby improving the fault tolerance of the overall network connection and supporting failover in the event of a hardware failure. In relation to load balancing, NIC teaming allows the sharing of traffic load among some or all of members of team 150. During load balancing, egress packets sent to team 150 are dispatched to one of its members 140-149.

Conventionally, configuring a team of physical NICs with different network speeds may lead to unbalanced load distribution. For example in FIG. 1, NICs 140-149 have different network speeds. In particular, "NIC1" 140, "NIC2" 141, "NIC3" 142, "NIC4" 143, "NIC5" 144, "NIC6" 145, "NIC7" 146 and "NIC8" 147 each support a slower network speed of 1 Gigabit per second (Gbps), while "NIC9" 148 and "NIC10" 149 supports a faster network speed of 10 Gbps. According to conventional load balancing algorithms, NICs 140-149 may be treated as equal options even though "NIC9" 148 and "NIC10" 149 have a higher speed capacity. This may lead to a sub-optimal load distribution among NICs 140-149, resulting in virtual machines 120-121 getting different throughput capabilities. One way to avoid using one team of NICs with different network speeds is to configure multiple teams, such as one team (e.g., NICs 140-147) with a slower speed for a control path and another team (e.g., NICs 148-149) with a higher speed for a data path. However, this may be inefficient because only certain NICs are available for a particular type of traffic.

Weighted Load Balancing

According to examples of the present disclosure, instead of treating each member of team 150 as equal options, a weighted load balancing approach may be implemented to take into account the different network speeds of NICs 140-149 from team 150. To distribute the load more fairly and efficiently, "load balancing weights" are assigned to respective NICs 140-149 based on their network speed. As used herein, the term "load balancing weight" may refer generally to a factor used to distribute load among members of team 150 such that members assigned with different load balancing weights are allocated with different proportions of the overall load.

Figure 2:
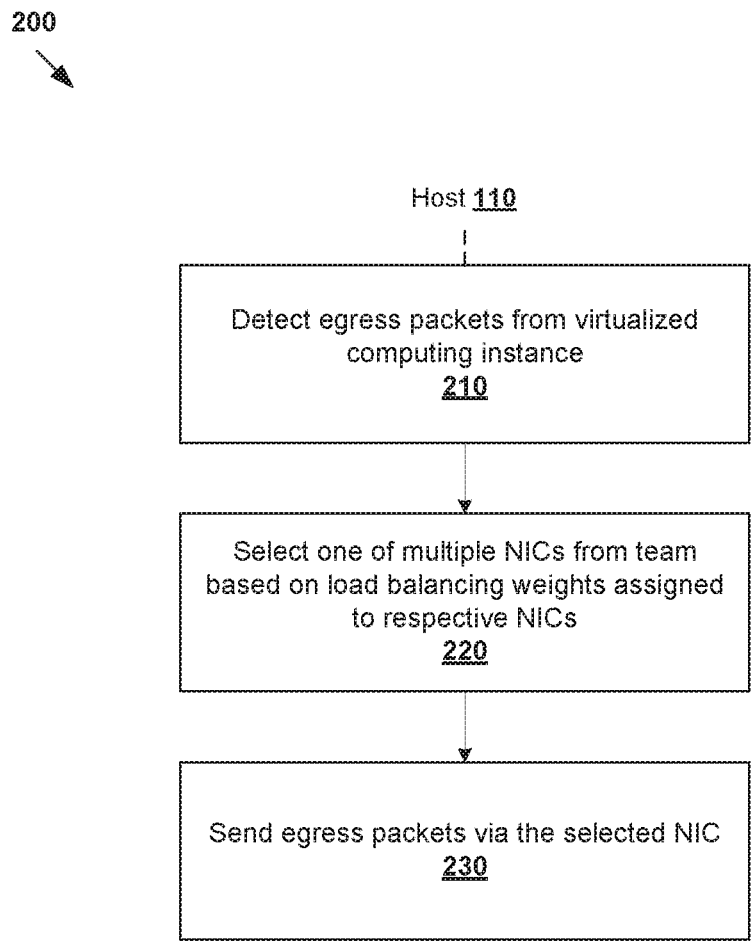
FIG. 2 is a flowchart of an example process for a host to perform load balancing for multiple NICs configured as a team.

In more detail, FIG. 2 is a flowchart of example process 200 for host 110 to perform load balancing for multiple NICs 140-149 configured as team 150. Example process 200 may include one or more operations, functions, or actions illustrated by one or more blocks, such as 210 to 230. The various blocks may be combined into fewer blocks, divided into additional blocks, and/or eliminated depending on the desired implementation. In the example in FIG. 1, example process 200 may be performed by hypervisor 112 of host 110, such as using load balancing module 132, etc.

At 210 in FIG. 2, host 110 detects egress packets 190 from "VM1" 120 for transmission to a destination (e.g., external host) via team 150, which includes NICs 140-149. Throughout the present disclosure, "VM1" 120 will be used an example "virtualized computing instance" that sends egress packets 190 for forwarding via team 150.

At 220 in FIG. 2, host 110 selects one of NICs 140-149 from team 150 based on load balancing weights associated with respective NICs 140-149. For each member i=1, . . . , N of team 150, the load balancing weight ($w_i$) may be assigned based on the network speed ($C_i$) of that member. This way, load may be distributed among members with different network speeds based on different load balancing weights.

At 230 in FIG. 2, egress packets 190 are sent to the destination via the selected NIC. For example in FIG. 1, "NIC9" 148 may be selected to send egress packets 190 from "VM1" 120 via physical network 102.

Example process 200 may be used to implement a multi-level load balancing approach for team 150 with a mix of logical and physical NICs. In the example in FIG. 1, "NIC1" 140, "NIC2" 141, "NIC3" 142, "NIC4" 143, "NIC5" 144, "NIC6" 145, "NIC7" 146 and "NIC8" 147 may form a logical NIC in the form of "lag0" 160 that represents a link aggregation group (e.g., created using LACP, etc.). By forming "lag0" 160, the individual speed capacities of NICs 140-147 may be aggregated. A load balancing weight is assigned to "lag0" 160 based on the total network speed=8 Gbps (8×1 Gbps) of its physical members.

In the example in FIG. 1, team 150 may be formed with "lag0" 160, "NIC9" 148 and "NIC10" 149 as its members. In this case, a first-level load balancing may be performed to select one member from team 150 (i.e., "lag0" 160, "NIC9" 148 and "NIC10" 149) to handle egress packets 190. If "lag0" 160 is selected, a second-level load balancing is performed to select one member from "lag0" 160 to handle egress packets 190. Both levels of load balancing are performed based on the load balancing weights of the respective members to facilitate a fairer and more efficient load distribution that takes into account the different network speeds of NICs 140-149.

In the following, various examples will be described using FIG. 3 to FIG. 7, such as load balancing weight assignment using FIG. 3 and FIG. 4, load balancing using FIG. 5 and failover configuration using FIG. 6 and FIG. 7. Examples of the present disclosure may be implemented by hypervisor 112 of host 110, such as using load balancing module 132, etc.

Load Balancing Weight Assignment

Figure 3:
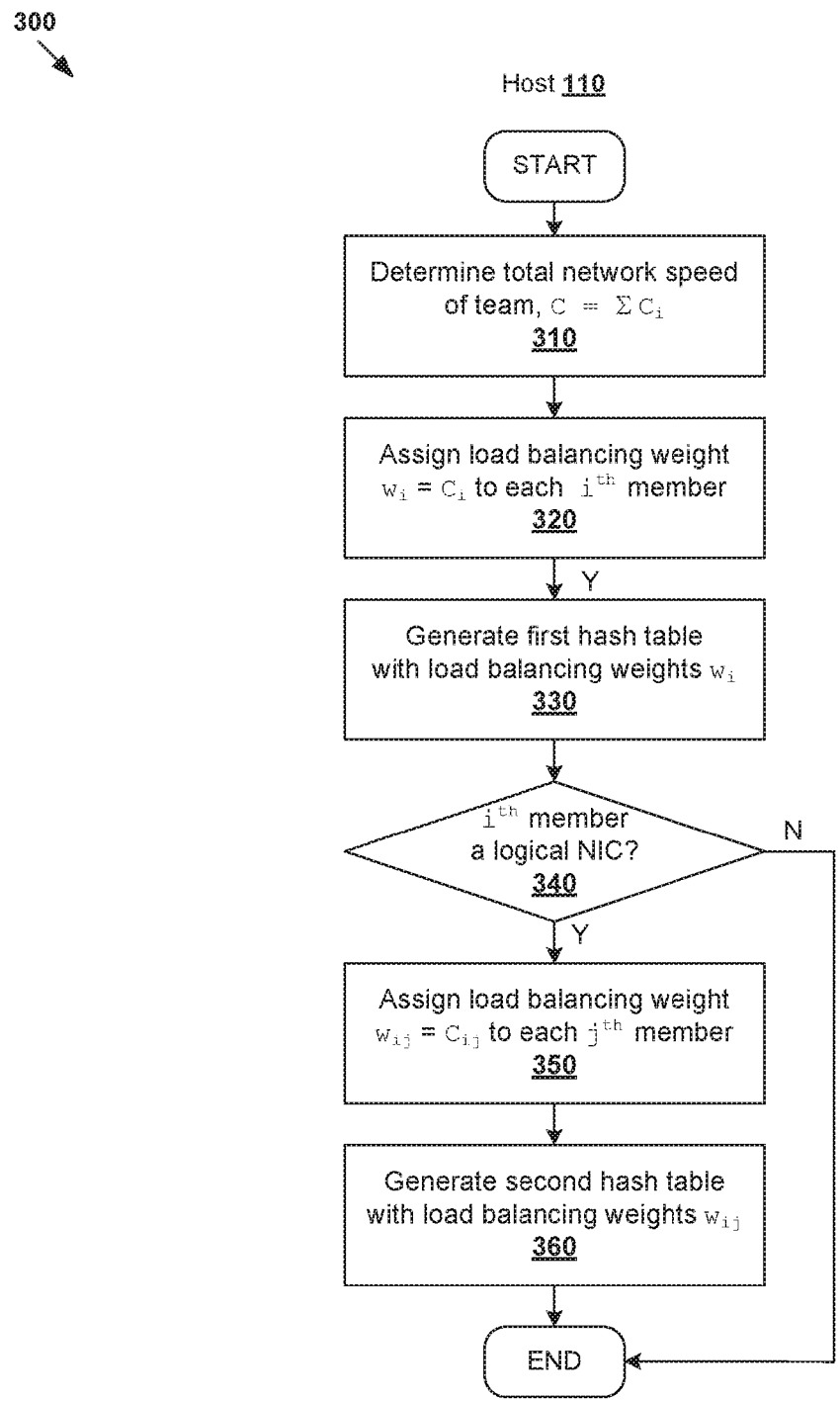
FIG. 3 is a flowchart of an example process for a host to perform load balancing weight assignment for multiple NICs configured as a team.

FIG. 3 is a flowchart of example process 300 for host 110 to perform load balancing weight assignment for multiple NICs 140-149 configured as team 150. Example process 300 may include one or more operations, functions, or actions illustrated by one or more blocks, such as 310 to 360. The various blocks may be combined into fewer blocks, divided into additional blocks, and/or eliminated depending on the desired implementation. Example process 300 will be explained using FIG. 4, which is a schematic diagram illustrating example assignment 400 of load balancing weights according to example process 300 in FIG. 3.

At 310 in FIG. 3, a total network speed is determined for team 150. For example, the total network speed may be calculated using $C=\sum_{i=1}^{N} C_i$, where N is the size of team 150 and $C_i$ is the network speed of the $i^{th}$ member for i=1, N. Since member "lag0" 160 is a logical NIC, its network speed is an aggregate value calculated using $C_i = \sum_{j=1}^{M} C_{ij}$, where M is the size of the group and $C_{ij}$ is the network speed of the $j^{th}$ group member of "lag0" 160. Using i=1 for "lag0" 160, the network speed of "lag0" 160 is $C_1=8$ based on $C_{1j}=1$ Gbps for j=1, . . . , 8. Using i=2 for "NIC9" 148 and i=3 for "NIC10" 149, $C_2=C_3=10$ Gbps. The total network speed of team 150 is therefore C=28 Gbps.

At 320 in FIG. 3, a load balancing weight ($w_i$) is assigned to each member of team 150 based on their network speed. Using $w_i=C_i$ for example, $w_1=C_1=8$ for "lag0" 160; $w_2=C_2=10$ for "NIC9" 148; and $w_3=C_3=10$ for "NIC10" 149. At 330 in FIG. 3, a first hash table is generated based on load balancing weights $w_1$, $w_2$ and $w_3$.

Figure 4:
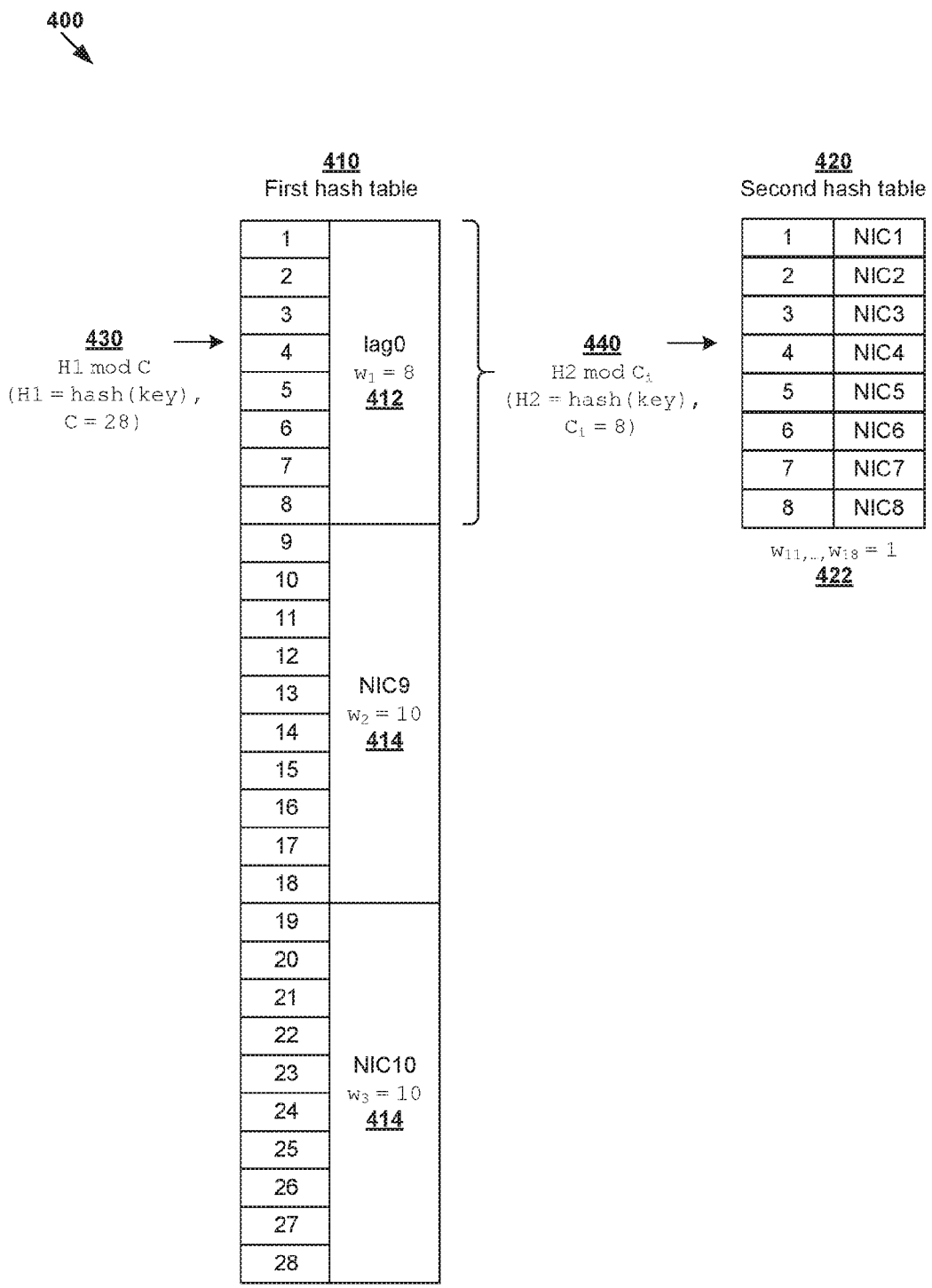
FIG. 4 is a schematic diagram illustrating an example assignment of load balancing weights according to the example process in FIG. 3.

In the example in FIG. 4, first hash table 410 includes entries representing the load balancing weights $w_1=8$, $w_2=10$ and $w_3=10$. The total number of entries (also known as "bins," "buckets," etc.) is 28 based on total network speed of team 150, i.e., C=28 Gbps. In first hash table 410, entries 1-8 represent "lag0" 160 (see 412), entries 9-18 represent "NIC9" 148 (see 414) and entries 19-28 represent "NIC10" 149 (see 416). As will be discussed further using FIG. 5, a first hash value (see 430) will be calculated and mapped to one of entries 1-28 during load balancing.

At 340 and 350 in FIG. 3, in response to determination that team 150 includes a logical NIC, a load balancing weight is also calculated for each member of the logical NIC. For "lag0" 160 with size M=8, the corresponding load balancing weights are $w_{1j}=1$ for j=1, . . . , 8 based on network speed $C_{1j}=1$ Gbps of NICs 140-147.

At 360 in FIG. 3, a second hash table is generated with entries representing the load balancing weights of NICs 140-147. For example in FIG. 4, second hash table 420 includes eight entries that each represent $w_{1j}=C_{1j}=1$ (see 422) of associated "NIC1" 140, "NIC2" 141, "NIC3" 142, "NIC4" 143, "NIC5" 144, "NIC6" 145, "NIC7" 146 or "NIC8" 147. As will be discussed further using FIG. 5, if a first hash value (see 430) is mapped to any one of bins 1-8, a second hash value (see 440) is calculated to select the specific member of "lag0" 160 to handle egress packets 190.

Using the above examples, a higher load balancing weight may be assigned to "NIC9" 148 and "NIC10" 149 to allocate them with a larger portion of the overall load compared to that allocated to "lag0" 160. In first hash table 410 in FIG. 4, "lag0" 160 is associated with 8/28=28% of the entries, while "NIC9" 148 and "NIC10" 149 are each associated with 10/28=36% of the entries. In second hash table 420 in FIG. 4, NIC1" 140, "NIC2" 141, "NIC3" 142, "NIC4" 143, "NIC5" 144, "NIC6" 145, "NIC7" 146 and "NIC8" 147 are each associated with 1/8=12.5% of the entries, or 1/28=3.5% of the total number of entries when first hash table 410 is combined with second hash table 420. This should be contrasted with conventional approaches that treat physical NICs 140-149 as equal options and allocate 1/10=10% of the total entries to each of them.

It should be understood that any other suitable format or data structure of hash tables 410, 420 may be used. First hash table 410 may also be combined with second hash table 420. In this case, entries 1-8 (i.e., a subset) of first hash table 410 may form second hash table 420 to represent corresponding entries 1-8 associated with respective "NIC1" 140 to "NIC8" 147 of "lag0" 160. When performing load balancing, second hash value 440 may be mapped to one of entries 1-8 in first hash table 410. As will be explained using FIG. 5, first hash value 430 and second hash value 440 may be the same.

Although two hash tables 410, 420 are shown in FIG. 4, it should be understood that a member of a logical NIC may be a logical NIC itself. For example, if "NIC2" 141 is a link aggregation group, its weight $w_{12}$ may be set according to the total network speed of members of the group. In this case, a weight (e.g., $w_{12k}$) may be assigned to each kth member of "NIC2" 141 based on its network speed.

Multi-Level Load Balancing

Figure 5:
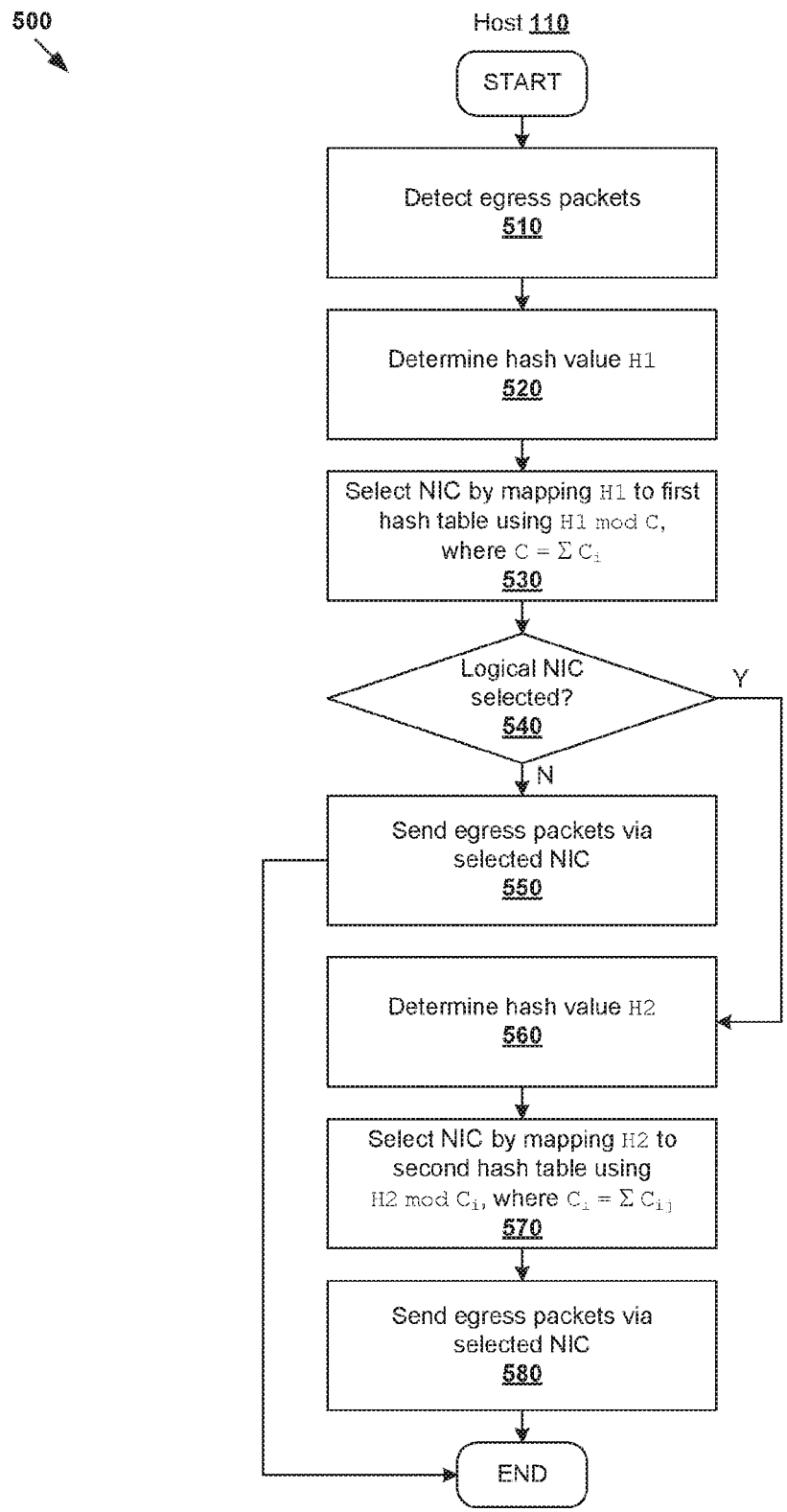
FIG. 5 is a flowchart of an example detailed process for a host to perform load balancing for multiple NICs configured as a team.

FIG. 5 is a flowchart of detailed example process 500 for host 110 to perform load balancing for multiple NICs 140-149 configured as team 150. Example process 500 may include one or more operations, functions, or actions illustrated by one or more blocks, such as 510 to 580. The various blocks may be combined into fewer blocks, divided into additional blocks, and/or eliminated depending on the desired implementation. Example process 500 may be performed by hypervisor 112 of host 110, such as using load balancing module 132, etc.

At 510 and 520 in FIG. 5, in response to detection of egress packets 190 from "VM1" 120, a first hash value H1 (see 430 in FIG. 4) is calculated, such as applying a hashing function to a key (e.g., H1=hash(key)). In one example, header information of egress packets 190 may be used as the key, such as one or more of the following: source Media Access Control (MAC) address, destination MAC address, source port number, destination port number, source Internet Protocol (IP) address, destination IP address and protocol. In another example, the key may be an identifier of a virtual port via which virtual switch 130 receives egress packets 190 from "VM1" 120. Any suitable hashing function may be used to transform the key to H1, such as a cryptographic hashing function, etc.

At 530 in FIG. 5, a member of team 150 is selected by mapping H1 to one of C=28 entries of first hash table 410 using a modulus operation (e.g., H1 mod C). If mapped to any one of entries 1-8 (see 412), associated "lag0" 160 is selected. If mapped to one of entries 9-18 (see 414), associated "NIC9" 148 will be selected. Otherwise, if mapped to any one of entries 19-28 (see 416), associated "NIC10" 149 will be selected.

At 540 and 550 in FIG. 5, in response to the selection of "NIC9" 148 or "NIC10" 149, egress packets 190 are sent via the selected physical NIC. Otherwise, in response to the selection of "lag0" 160, example process 500 proceeds to 560 in FIG. 5.

In particular, at 560 in FIG. 5, a second hash value H2 (see 440 in FIG. 4) is calculated, such as by applying a hashing function to a key (e.g., H2=hash(key)). In practice, the same key may be used for H1 and H2, in which case H1 is used as H2 (i.e., H2=H1) and it is not necessary to reapply the hashing function. Depending on the desired implementation, different keys may be used instead to generate different H1 and H2 (i.e., H2≠H1).

Similar to 520 in FIG. 5, H2 may be calculated using header information of egress packets 190 as the key, such as one or more of the following: source Media Access Control (MAC) address, destination MAC address, source port number, destination port number, source Internet Protocol (IP) address, destination IP address and protocol. In another example, the key may be an identifier of a virtual port via which virtual switch 130 receives egress packets 190 from "VM1" 120. Again, any suitable hashing function may be used to transform the key to H2, such as a cryptographic hashing function, etc.

At 570 in FIG. 5, a member of "lag0" 160 is selected by mapping H2 to one of $C_1=8$ bins of second hash table 420 using a modulus operation (e.g., H2 mod $C_1$). For example, "NIC1" 140 is selected if mapped to the first entry of second hash table 420, "NIC2" 141 is selected if mapped to the second entry, "NIC3" 142 is selected if mapped to the third entry, and so on. At 580 in FIG. 5, egress packets 190 are sent via the selected member (e.g., "NIC2" 141) of "lag0" 160.

In the above examples, blocks 510 to 550 represent a first level of load balancing to select a member of team 150 to send egress packets 190. If a logical NIC is selected, a second-level of load balancing is performed according to blocks 560 to 580 to select a member (e.g., "NIC2" 141) of the selected logical NIC (e.g., "lag0" 160). Since the load balancing weight is assigned to each first-level member of team 150 and second-level of "lag0" 160 based on the different network speeds, load balancing may be performed among team 150, and where appropriate among "lag0" 160. In practice, more than two levels of load balancing may be performed. For example, if "NIC2" 141 selected from "lag0" 160 is also logical NIC, a third level of load balancing may be performed to select a member of "NIC2" 141 to handle egress packets 190. In this case, a third hash table may be created with entries representing the load balancing weights assigned to respective members of "NIC2" 141 based on their network speed.

Examples of the present disclosure may be used together with any suitable teaming policy. In one example, when selecting among members with equal network speed, the selection may also be based on a particular failover order (e.g., configured by a network administrator). In another example, load balancing may be performed based on only the load balancing weights assigned based on the different network speeds, but also a current load of NICs 140-149. In this case, each load balancing weight may be adjusted based on the current load such that a NIC with a lower utilization is given more weight, etc.

In practice, NIC teaming may be supported by any suitable implementation or architecture of hypervisor 112, such as VMware ESXi (a trademark of VMware, Inc.), Microsoft Hyper-V (a trademark of Microsoft Corporation), Kernel-based Virtual Machine (KVM) for a Linux kernel, etc. For example, in the case of KVM, a first bond (e.g., "bondA") may be configured to represent team 150. The first bond is then attached to multiple slave nodes that include "NIC9" 148, "NIC10" 149 and a second bond (e.g., "bond0") representing "lag0" 160.

Failover Configuration

Examples of the present disclosure may be used together with a failover configuration for team 150. FIG. 6 is a schematic diagram illustrating example virtualized computing environment 600 with a failover configuration. The example in FIG. 6 is similar to that in FIG. 1, except that there are six NICs 610-615 instead of ten. In particular, the network speed=10 Gbps for "NIC1" 610, "NIC2" 611, "NIC3" 612 and "NIC4" 613, 40 Gbps for "NIC5" 614 and 50 Gbps for "NIC6" 615. NICs 610-613 form a link aggregation group labelled "lag1" 620, while all NICs 610-615 form team 630.

To manage the different NICs 610-615, host 110 may maintain an "active list" (see 640) to store a list of NIC(s) that will be used to send and receive traffic, and a "standby list" (see 650) to store a list of backup NIC(s) that will be used when one of the active NIC(s) fails. For example in FIG. 6, "NIC5" 614 and "NIC6" 615 are placed on active list 640 and "lag1" 620 on the standby list. In this case, the speed capacity of host 110 is the total network speed of the active NICs, i.e., 40+50=90 Gbps.

Figure 6:
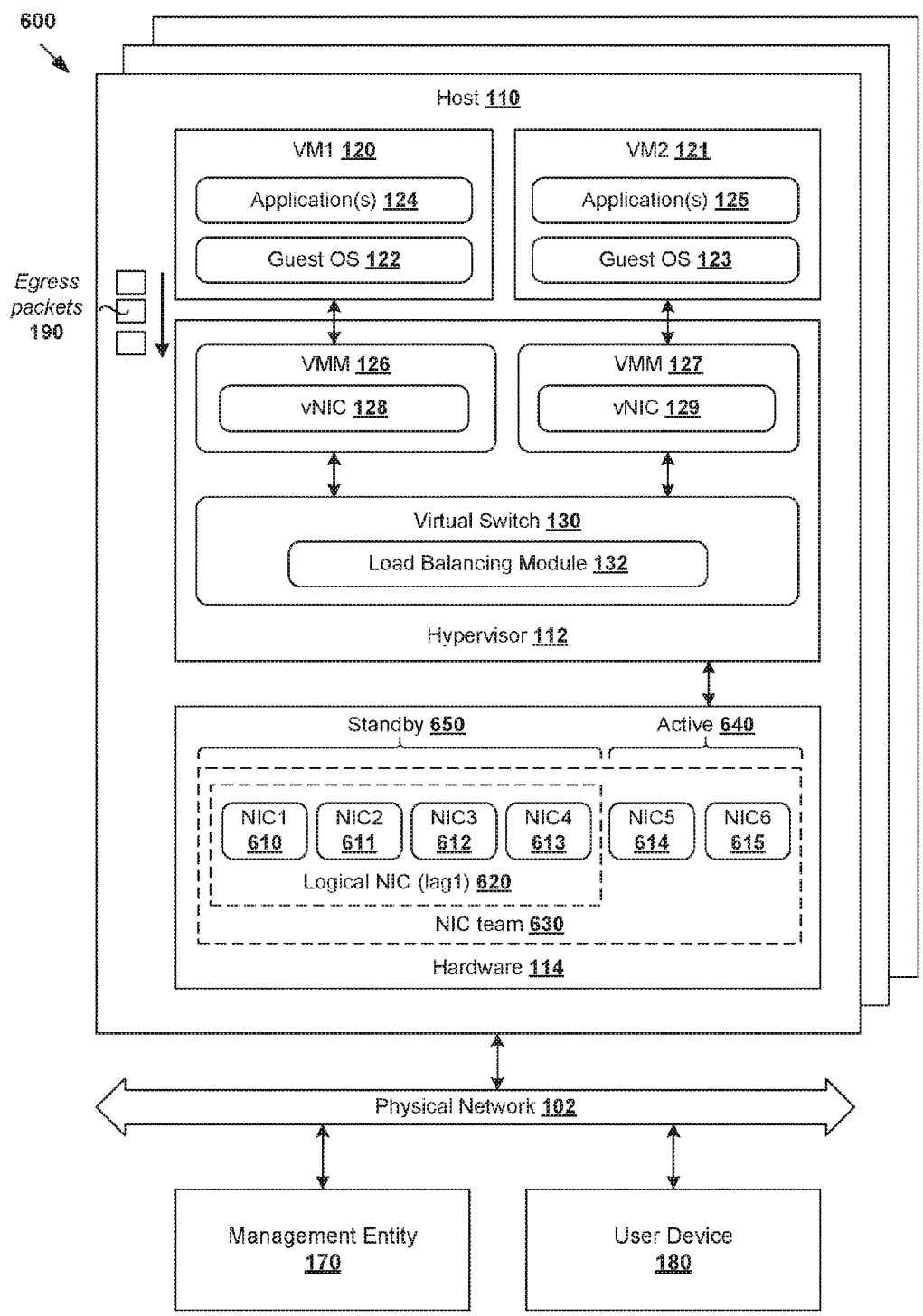
FIG. 6 is a schematic diagram illustrating an example virtualized computing environment with a failover configuration.
Figure 7:
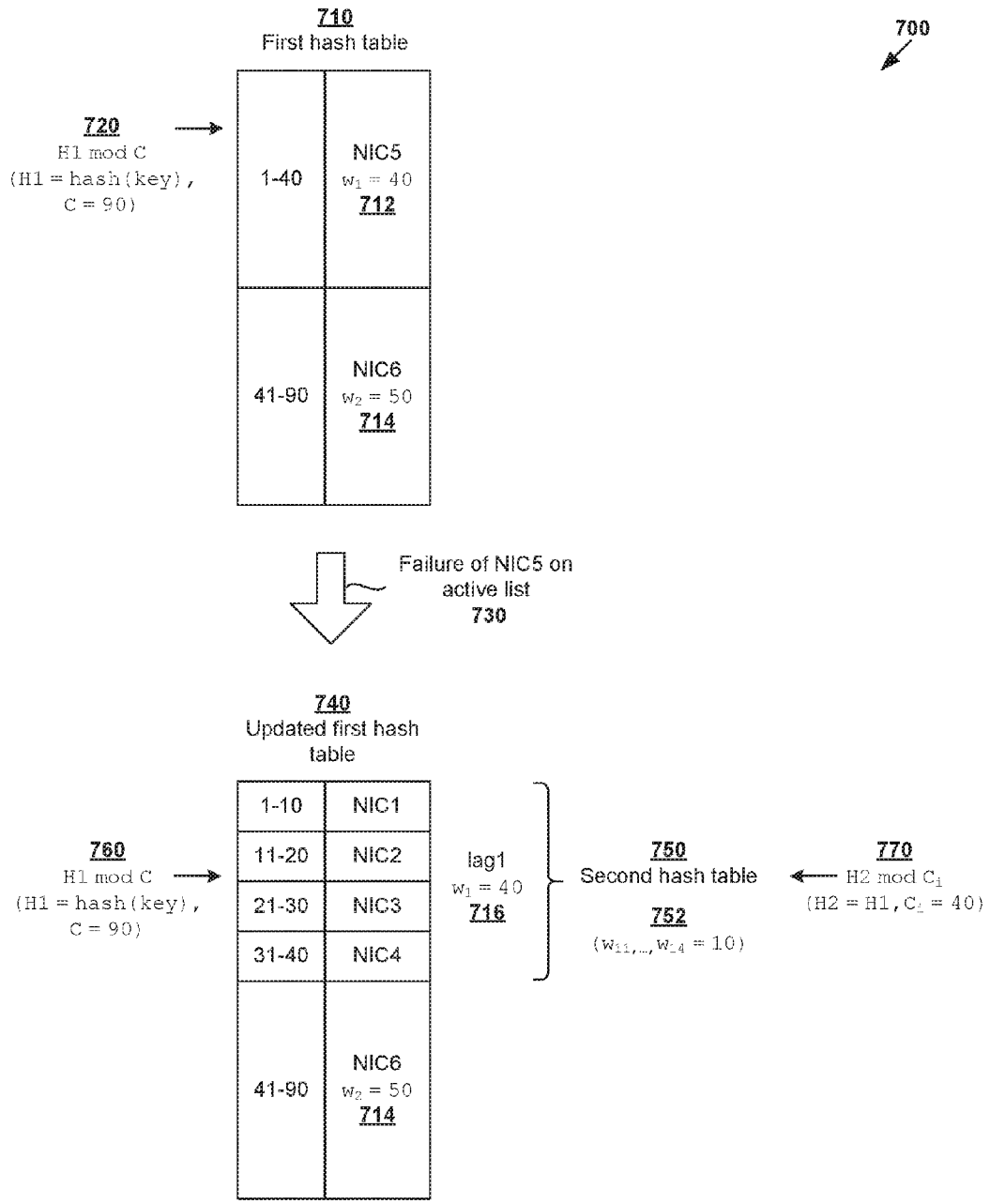
FIG. 7 is a schematic diagram illustrating an example of load balancing weights according to the example process in FIG. 3 for the virtualized computing environment in FIG. 6.

FIG. 7 is a schematic diagram illustrating example assignment 700 of load balancing weights according to example process 300 in FIG. 3 for virtualized computing environment 600 in FIG. 6. In first hash table 710, entries 1-40 are used to represent the load balancing weight $w_1=C_1=40$ of "NIC5" 614 and entries 41-90 to represent the load balancing weight $w_2=C_2=50$ of "NIC6" 615. During load balancing, hash value H1 is calculated and mapped to first hash table 710 to select either "NIC5" 614 or "NIC6" 615 to send egress packets 190 from "VM1" 120.

Active list 640 and standby list 650 may be updated according to the status of NICs 610-615. For example, in the event of a failure of "NIC5" 614 (see 730 in FIG. 7), "NIC5" 614 may be moved from active list 640 to standby list 650, while "lag1" 620 is promoted and moved from the standby list 650 to active list 640. This way, "lag1" 620 having a network speed=40 Gbps may be used with "NIC6" 615 to maintain the total speed capacity=90 Gbps. In practice, the failure of "NIC5" 614 may be caused by hardware failure, etc., and detected by hypervisor 112 based on a "link down" event.

In the event of a failure of "NIC5" 614, updated first hash table 740 may include entries 1-40 representing the load balancing weight $w_1=C_1=40$ of "lag1" 620 (see 716) instead of "NIC5" 614. Similarly, entries 41-90 are used to represent the load balancing weight $w_2=C_2=50$ of "NIC6" 615. In the example in FIG. 7, a combined hash table is used and second hash table 750 is formed by a subset of the entries of updated first hash table 740. In particular, since "lag1" 620 is a logical NIC, second hash table 750 is represented by entries 1-40 of updated first hash table 740, where entries 1-10 represent "NIC1" 610 assigned with $w_{11}=C_{11}=10$, entries 11-20 represent "NIC2" 611 with $w_{12}=C_{12}=10$, entries 21-30 represent "NIC3" 612 with $w_{13}=C_{13}=10$ and entries 31-40 "NIC4" 613 with $w_{14}=C_{14}=10$ (see also 752).

According to example process 500 in FIG. 5, a two-level load balancing approach may be used after "NIC5" 614 is replaced by "lag1" 620. A first-level load balancing may be performed according to blocks 510-550 to select between "lag1" 620 and "NIC6" 615 by mapping a first hash value H1 (see 760) to updated first hash table 712. If "lag1" 620 is selected, second-level load balancing is performed according to blocks 560-580 to select among "NIC1" 610, "NIC2" 611, "NIC3" 612 and "NIC4" 613 by mapping a second hash value H2 (see 770). In the example in FIG. 7, second hash value 770 (e.g., H2=H1) is mapped to second hash table 750, whose entries 1-40 are a subset of the entries of updated first hash table 740.

Once "NIC5" 614 recovers from the failure (e.g., detected by hypervisor 112 based on a "link up" event), "lag1" 620 may be moved from active list 640 to standby list 650, and "NIC5" 614 moved from standby list 650 to active list 640. During load balancing, first hash table 710 may be used instead.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and PNIC(s) that may communicate with each other via a communication bus, etc. The computing device may include a non-transitory computer-readable medium having stored thereon instructions or program code that, when executed by the processor, cause the processor to perform processes described herein with reference to FIG. 1 to FIG. 7. For example, computing devices capable of acting as host 110 may be deployed in virtualized computing environment 100/600.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PFD1), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a host to perform load balancing for multiple network interface controllers (NICs) configured as a team, the method comprising:
   detecting egress packets from a virtualized computing instance supported by the host for transmission to a destination via the team;
   based on load balancing weights associated with the respective multiple NICs, selecting one of the multiple NICs from the team, wherein each load balancing weight is assigned based on a network speed supported by the associated NIC, and different load balancing weights are indicative of different network speeds among the multiple NICs in the team; and
   sending, via the selected one of the multiple NICs, the egress packets to the destination.

2. The method of claim 1, wherein the team includes a logical NIC that logically groups multiple physical NICs and the selecting one of the multiple NICs from the team comprises:
   in response to determination that the logical NIC is selected, selecting one of the multiple physical NICs from the logical NIC based on load balancing weights associated with the respective multiple physical NICs, wherein each load balancing weight is assigned based on a network speed supported by the associated physical NIC.

3. The method of claim 2, wherein the method further comprises:
   assigning the load balancing weights to respective multiple NICs in the team based on the network speeds supported by the respective multiple NICs, wherein the load balancing weight assigned to the logical NIC is based on a total network speed supported by the multiple physical NICs.

4. The method of claim 2, wherein the selecting one of the multiple NICs from the team comprises:
   determining a first hash value associated with the egress packets; and
   mapping the first hash value to a first hash table to select one of the multiple NICs from the team, wherein the first hash table includes entries representing the load balancing weights assigned to respective multiple NICs.

5. The method of claim 4, wherein the team includes an active NIC on an active list and a backup NIC on a standby list and the method further comprises:
   in response to determination that the active NIC is down, moving the active NIC from the active list to the standby list, moving the backup NIC from the standby list to the active list and updating the first hash table to include one or more entries representing a load balancing weight of the backup NIC.

6. The method of claim 4, wherein the selecting one of the multiple physical NICs from the logical NIC comprises:
mapping a second hash value to a second hash table to select one of the multiple physical NICs from the logical NIC, wherein the second hash table includes entries representing the load balancing weights assigned to respective multiple physical NICs.

7. The method of claim 6, wherein the selecting one of the multiple physical NICs from the logical NIC comprises:
using the first hash value to be the second hash value, mapping the first hash value to a subset of the entries of the first hash table to select the one of the multiple physical NICs from the logical NIC, wherein the subset of the entries of the first hash table are the entries of the second hash table.

8. The method of claim 6, wherein the selecting one of the multiple NICs from the team comprises:
determining the first hash value or second hash value, or both, by applying a hashing function on one or more of the following: header information of the egress packets and a virtual port identifier via which the egress packets are received from the virtualized computing instance.

9. A non-transitory computer-readable storage medium that includes a set of instructions which, in response to execution by a processor of a host, cause the processor to perform a method of load balancing for multiple network interface controllers (NICs) configured as a team, the method comprising:
detecting egress packets from a virtualized computing instance supported by the host for transmission to a destination via the team;
based on load balancing weights associated with the respective multiple NICs, selecting one of the multiple NICs from the team, wherein each load balancing weight is assigned based on a network speed supported by the associated NIC, and different load balancing weights are indicative of different network speeds among the multiple NICs in the team; and
sending, via the selected one of the multiple NICs, the egress packets to the destination.

10. The non-transitory computer-readable storage medium of claim 9, wherein the team includes a logical NIC that logically groups multiple physical NICs and the selecting one of the multiple NICs from the team comprises:
in response to determination that the logical NIC is selected, selecting one of the multiple physical NICs from the logical NIC based on load balancing weights associated with the respective multiple physical NICs, wherein each load balancing weight is assigned based on a network speed supported by the associated physical NIC.

11. The non-transitory computer-readable storage medium of claim 10, wherein the method further comprises:
assigning the load balancing weights to respective multiple NICs in the team based on the network speeds supported by the respective multiple NICs, wherein the load balancing weight assigned to the logical NIC is based on a total network speed supported by the multiple physical NICs.

12. The non-transitory computer-readable storage medium of claim 10, wherein the selecting one of the multiple NICs from the team comprises:
determining a first hash value associated with the egress packets; and
mapping the first hash value to a first hash table to select one of the multiple NICs from the team, wherein the first hash table includes entries representing the load balancing weights assigned to respective multiple NICs.

13. The non-transitory computer-readable storage medium of claim 12, wherein the team includes an active NIC on an active list and a backup NIC on a standby list and the method further comprises:
in response to determination that the active NIC is down, moving the active NIC from the active list to the standby list, moving the backup NIC from the standby list to the active list and updating the first hash table to include one or more entries representing a load balancing weight of the backup NIC.

14. The non-transitory computer-readable storage medium of claim 12, wherein the selecting one of the multiple physical NICs from the logical NIC comprises:
mapping a second hash value to a second hash table to select one of the multiple physical NICs from the logical NIC, wherein the second hash table includes entries representing the load balancing weights assigned to respective multiple physical NICs.

15. The non-transitory computer-readable storage medium of claim 14, wherein the selecting one of the multiple physical NICs from the logical NIC comprises:
using the first hash value to be the second hash value, map the first hash value to a subset of the entries of the first hash table to select the one of the multiple physical NICs from the logical NIC, wherein the subset of the entries of the first hash table are the entries of the second hash table.

16. The non-transitory computer-readable storage medium of claim 14, wherein the selecting one of the multiple NICs from the team comprises:
determining the first hash value or second hash value, or both, by applying a hashing function on one or more of the following: header information of the egress packets and a virtual port identifier via which the egress packets are received from the virtualized computing instance.

17. A host configured to perform load balancing, the host comprising:
a processor;
multiple network interface controllers (NICs) configured as a team; and
a non-transitory computer-readable medium having stored thereon instructions that, when executed by the processor, cause the processor to:
detect egress packets from a virtualized computing instance supported by the host for transmission to a destination via the team;
based on load balancing weights associated with the respective multiple NICs, select one of the multiple NICs from the team, wherein each load balancing weight is assigned based on a network speed supported by the associated NIC, and different load balancing weights are indicative of different network speeds among the multiple NICs in the team; and
send, via the selected one of the multiple NICs, the egress packets to the destination.

18. The host of claim 17, wherein the team includes a logical NIC that logically groups multiple physical NICs and the instructions for selecting one of the multiple NICs from the team cause the processor to:
in response to determination that the logical NIC is selected, select one of the multiple physical NICs from the logical NIC based on load balancing weights associated with the respective multiple physical NICs, wherein each load balancing weight is assigned based on a network speed supported by the associated physical NIC.

19. The host of claim 18, wherein the instructions further cause the processor to:
assign the load balancing weights to respective multiple NICs in the team based on the network speeds supported by the respective multiple NICs, wherein the load balancing weight assigned to the logical NIC is based on a total network speed supported by the multiple physical NICs.

20. The host of claim 18, wherein the instructions for selecting one of the multiple NICs from the team cause the processor to:
determine a first hash value associated with the egress packets; and
map the first hash value to a first hash table to select one of the multiple NICs from the team, wherein the first hash table includes entries representing the load balancing weights assigned to respective multiple NICs.

21. The host of claim 20, wherein the team includes an active NIC on an active list and a backup NIC on a standby list and the instructions further cause the processor to:
in response to determination that the active NIC is down, move the active NIC from the active list to the standby list, move the backup NIC from the standby list to the active list and update the first hash table to include one or more entries representing a load balancing weight of the backup NIC.

22. The host of claim 20, wherein the instructions for selecting one of the multiple physical NICs from the logical NIC cause the processor to:
map a second hash value to a second hash table to select one of the multiple physical NICs from the logical NIC, wherein the second hash table includes entries representing the load balancing weights assigned to respective multiple physical NICs.

23. The host of claim 22, wherein the instructions for selecting one of the multiple physical NICs from the logical NIC cause the processor to:
using the first hash value to be the second hash value, map the first hash value to a subset of the entries of the first hash table to select the one of the multiple physical NICs from the logical NIC, wherein the subset of the entries of the first hash table are the entries of the second hash table.

24. The host of claim 22, wherein the instructions for selecting one of the multiple NICs from the team cause the processor to:
determine the first hash value or second hash value, or both, by applying a hashing function on one or more of the following: header information of the egress packets and a virtual port identifier via which the egress packets are received from the virtualized computing instance.

* * * * *